United States Patent
Lee et al.

(10) Patent No.: US 8,615,659 B2
(45) Date of Patent: Dec. 24, 2013

(54) SYSTEM AND METHOD FOR ACQUIRING TERMINAL BINDING KEY

(75) Inventors: Byung-Rae Lee, Seoul (KR); Bo-Sun Jung, Seongnam-si (KR); Sung-Oh Hwang, Yongin-si (KR); Kook-Heui Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 393 days.

(21) Appl. No.: 12/739,081

(22) PCT Filed: Nov. 17, 2008

(86) PCT No.: PCT/KR2008/006758
§ 371 (c)(1),
(2), (4) Date: Apr. 21, 2010

(87) PCT Pub. No.: WO2009/064145
PCT Pub. Date: May 22, 2009

(65) Prior Publication Data
US 2010/0262826 A1    Oct. 14, 2010

(30) Foreign Application Priority Data

Nov. 16, 2007 (KR) .......................... 10-2007-0117457
Nov. 16, 2007 (KR) .......................... 10-2007-0117464

(51) Int. Cl.
*H04L 29/00* (2006.01)

(52) U.S. Cl.
USPC ........... 713/170; 713/150; 713/168; 709/225; 709/226; 709/227; 709/228; 709/229; 380/247; 380/248; 380/249; 380/250

(58) Field of Classification Search
USPC ........................................................ 713/170
See application file for complete search history.

(56) References Cited

U.S. PATENT DOCUMENTS

| | | | |
|---|---|---|---|
| 2002/0188844 A1* | 12/2002 | Yoshinobu .................... | 713/163 |
| 2005/0013268 A1* | 1/2005 | Chang et al. .................. | 370/328 |
| 2006/0236405 A1 | 10/2006 | Terauchi et al. | |
| 2007/0133805 A1* | 6/2007 | Hwang et al. ................. | 380/270 |
| 2007/0177550 A1* | 8/2007 | Kwon et al. ................... | 370/331 |
| 2007/0220558 A1* | 9/2007 | Jung et al. ...................... | 725/62 |

FOREIGN PATENT DOCUMENTS

| | | |
|---|---|---|
| JP | 2004312517 A | 11/2004 |
| JP | 2006301887 A | 11/2006 |
| JP | 2007-094992 | 4/2007 |
| JP | 2007158420 A | 6/2007 |
| WO | WO 2007/097604 | 8/2007 |

* cited by examiner

*Primary Examiner* — Ghazal Shehni
(74) *Attorney, Agent, or Firm* — The Farrell Law Firm, P.C.

(57) ABSTRACT

A first terminal subscribes to at least one service using a service guide in which information necessary for reception of each service is stored, and sends the service guide and an identifier (ID) of the subscribed service to a smartcard. The smartcard stores the service guide and the ID of the subscribed service, and sends the service guide and the ID of the subscribed service to a second terminal through a response message to a request message used for acquiring TBK information, received from the second terminal. The second terminal receives the response message by sending the request message to the smartcard, acquires TBK information corresponding to a service that the second terminal intends to play back, from the service guide depending on the subscribed service's ID included in the response message, and acquires the TBK by performing an authentication process using the TBK information.

54 Claims, 7 Drawing Sheets

SYSTEM AND METHOD FOR ACQUIRING TERMINAL BINDING KEY

BACKGROUND OF THE INVENTION

1. Field of the Invention

The present invention relates generally to a mobile communication system, and in particular, to a system and method for acquiring a Terminal Binding Key (TBK) by a terminal in a mobile communication system.

2. Description of the Related Art

Smartcard Profile of Open Mobile Alliance (OMA) Broadcast version 1.0 (BCAST v1.0) standard, which is a Mobile Broadcast (BCAST) technology for a mobile communication system, uses Digital Rights Management (DRM)-related information so that broadcast services and contents can be used in security terminals using a smartcard. Use of the smartcard enables Rights Portability. The term 'Rights Portability' as used herein means a function of storing the DRM-related information in a smartcard such as Universal Subscribe Identity Module (USIM) card and User Identity Module (UIM) card, thereby making it possible for multiple terminals to play back the broadcast contents to which the user has previously subscribed. That is, the Rights Portability function allows several terminals to utilize broadcast services and contents subscribed by the user, using the DRM-related information such as Terminal Binding Key (TBK), stored in the smartcard.

A description will now be made of a method in which a security terminal uses broadcast services and contents using the TBK in the DRM-related information.

The TBK, an encryption key that a terminal is issued after it has successfully achieved an authentication process with a BCAST Subscription Management (BSM), is used for encrypting a Traffic Encryption Key (TEK). The TEK is an encryption key used for encrypting broadcast services and contents (hereinafter, 'services' for short). Therefore, only the terminal having the TBK can decrypt the TEK, and decrypt the encrypted services from the decrypted TEK, thus playing back the services.

Figure 1:
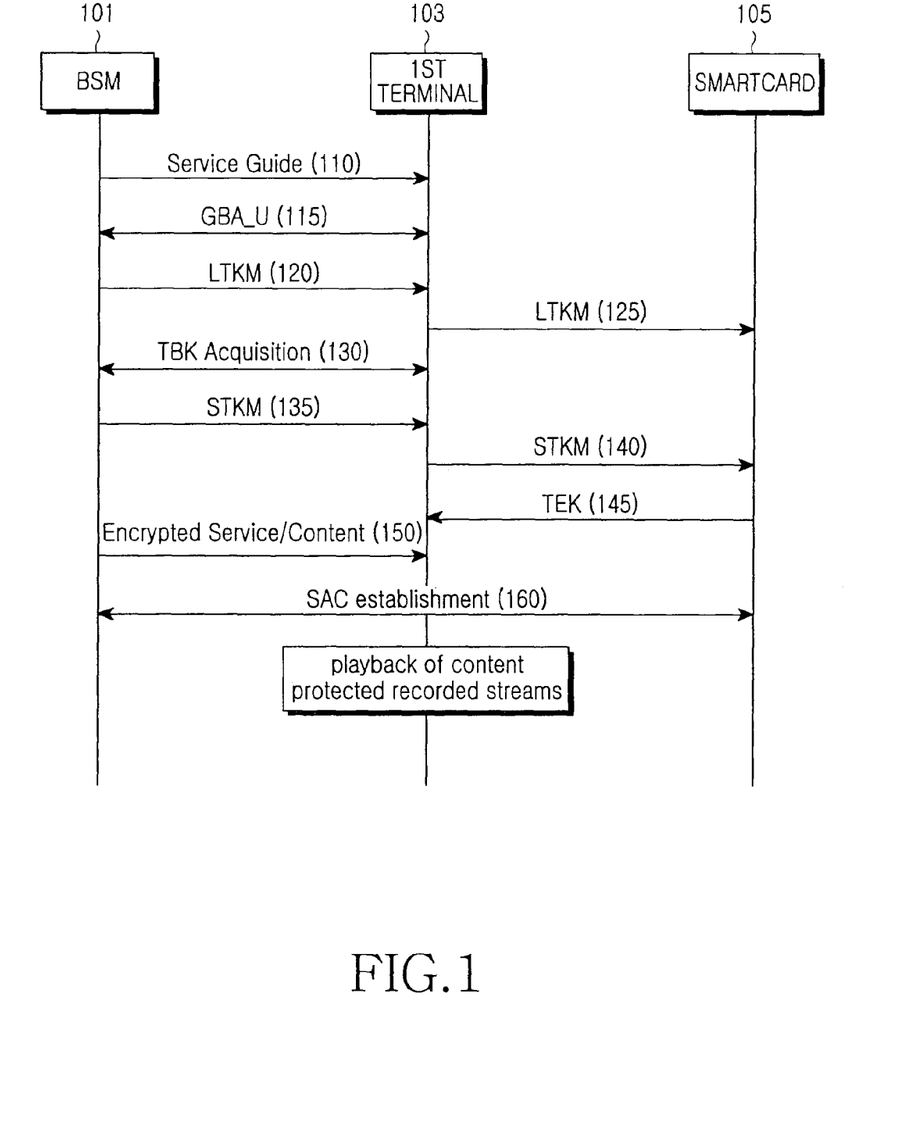
FIG. 1 is a diagram illustrating a method in which the conventional terminal performs an authentication process with a BSM to receive services.

With reference to FIG. 1, a description will now be made of a method in which the currently available terminal (hereinafter, 'first terminal') performs an authentication process with a BSM in order to be issued the above-stated TBK using a smartcard, thus to receive services.

FIG. 1 is a diagram illustrating a method in which the conventional terminal performs an authentication process with a BSM to receive services.

Referring to FIG. 1, in step 110, a first terminal 103 receives a service guide including service-related information and parameters from a BSM 101 that manages subscriber's subscription information for reception of BCAST services. In step 115, the first terminal 103 performs GBA_U through an interactive connection with the BSM 101. The GBA_U is an authentication technique between a terminal and a smartcard, defined in 3GPP TS 33.220. Thereafter, in step 120, the first terminal 103 acquires from the BSM 101 a Long-Term Key Message (LTKM) in which Service Encryption Key (SEK)/Service Authentication Key (SAK) or Program Encryption Key (PEK)/Program Authentication Key (PAK) are included. In step 125, the first terminal 103 sends the acquired LTKM to a smartcard 105.

In step 130, the first terminal 103 acquires a TBK through an interactive connection with the BSM 101. That is, the BSM 101 and the first terminal 103 establish an authentication and security channel through a Secure Hypertext Transfer Protocol (HTTPS). Further, the first terminal 103 sends a first terminal's identifier BCAST_Client_ID to the BSM 101 through the channel. After receiving the BCAST_Client_ID, the BSM 101 performs terminal security verification based on the BCAST_Client_ID, and issues a TBK according to the verification result. The BSM 101 sends the issued TBK to the first terminal 103 through the channel. Thus, the first terminal 103 can acquire a TBK.

In step 135, the BSM 101 generates a Short-Term Key Message (STKM) completed by digital-signing a STKM composed of other parameters including the encrypted TEK, using the SAK, and sends the generated STKM to the first terminal 103. In step 140, the first terminal 103 sends the received STKM to the smartcard 105. In step 145, the smartcard 105 detects a TEK from the received SKTM, and sends the detected TEK to the first terminal 103. In step 150, the first terminal 103 can receive the encrypted services and contents transmitted from the BSM 101, using the TEK.

Since the TEK extracted in step 145 was encrypted by the TBK, TBK decryption is achieved only in the authenticated terminal that has been having the TBK.

Since the BSM 101 sends the determined TBK to the first terminal 103 as described above, a new terminal (hereinafter, 'second terminal') that the user has newly gotten, cannot play back the services to which the user has previously subscribed. Therefore, the second terminal should perform a process of subscribing again to the previously subscribed services.

Therefore, there is a need for a scheme in which when a user replaces a first terminal with a second terminal, the second terminal can also acquire the TBK that the first terminal could acquire, in order to play back the previously subscribed services.

SUMMARY OF THE INVENTION

An aspect of the present invention is to address at least the problems and/or disadvantages and to provide at least the advantages described below. Accordingly, the present invention provides a system and method for acquiring a TBK using TBK-related information so that a new terminal can play back previously subscribed services in a mobile communication system.

According to one aspect of the present invention, there is provided a system for acquiring a Terminal Binding Key (TBK) in a mobile communication system. The TBK acquisition system includes a first terminal for subscribing to at least one service using a service guide in which information necessary for reception of each service is stored, and sending the service guide and an identifier (ID) of the subscribed service to a smartcard; the smartcard for storing the service guide and the ID of the subscribed service, and sending the service guide and the ID of the subscribed service to a second terminal through a response message to a request message used for acquiring TBK information, received from the second terminal; and the second terminal for receiving the response message by sending the request message to the smartcard, acquiring TBK information corresponding to a service that the second terminal intends to play back, from the service guide depending on the subscribed service's ID included in the response message, and acquiring the TBK by performing an authentication process using the TBK information.

According to another aspect of the present invention, there is provided a system for acquiring a Terminal Binding Key (TBK) in a mobile communication system. The TBK acquisition system includes a first terminal for subscribing to at least one service using a service guide in which information necessary for reception of each service is stored, and sending TBK-related information used for encrypting an encryption key of the subscribed service, to a smartcard; the smartcard for storing the TBK-related information, and outputting the TBK-related information through a response message to a request message used for acquiring the TBK-related information, received from the second terminal; and the second terminal for receiving the response message from the smartcard by sending the request message to the smartcard, acquiring TBK-related information corresponding to a service that the second terminal intends to play back, depending on the response message, and acquiring the TBK by performing an authentication process using the TBK-related information.

According to further another aspect of the present invention, there is provided a method for acquiring a Terminal Binding Key (TBK) in a mobile communication system. The TBK acquisition method includes subscribing, by a the first terminal, to at least one service using a service guide in which information necessary for reception of each service is stored, and sending the service guide and an identifier (ID) of the subscribed service to a smartcard; storing, by the smartcard, the service guide and the ID of the subscribed service; sending, by a second terminal, a request message for acquiring TBK information to the smartcard; sending, by the smartcard, the stored service guide and ID of the subscribed service to the second terminal through a response message to the request message; and receiving, by the second terminal, the response message, acquiring TBK information corresponding to a service that the second terminal intends to play back, from the service guide depending on the ID of the subscribed service, included in the response message, and acquiring the TBK by performing an authentication process using the acquired TBK information.

According to yet another aspect of the present invention, there is provided a method for acquiring a Terminal Binding Key (TBK) in a mobile communication system. The TBK acquisition method includes subscribing, by a the first terminal, to at least one service using a service guide in which information necessary for reception of each service is stored, and sending TBK-related information used for encrypting an encryption key of the subscribed service, to a smartcard; storing, by the smartcard, the TBK-related information; sending, by a second terminal, a request message for acquiring the TBK-related information to the smartcard; sending, by the smartcard, the stored TBK-related information to the second terminal through a response message to the request message; and receiving, by the second terminal, the response message, acquiring TBK-related information corresponding to a service that the second terminal intends to play back, depending on the response message, and acquiring the TBK by performing an authentication process using the TBK-related information.

According to still another aspect of the present invention, there is provided a system for acquiring a Terminal Binding Key (TBK) in a mobile communication system. The TBK acquisition system includes a first terminal for receiving a service guide, in which information necessary for reception of each service is stored, from a BCAST Service Distribution/Adaptation (B SD/A), subscribing to at least one service using the service guide, and sending acquisition information for acquiring the service guide and an identifier (ID) of the subscribed service, to a smartcard; the smartcard for storing the acquisition information and the ID of the subscribed service, sending the acquisition information to a second terminal through a response message to a first request message for acquiring the acquisition information, received from the second terminal, and sending the ID of the subscribed service to the second terminal through a response message to a second request message for acquiring the ID of the subscribed service, received from the second terminal; and the second terminal for receiving a service guide based on the acquisition information from the BSD/A by sending a third request message for requesting the service guide based on the acquisition information to the BSD/A, receiving an ID of the subscribed service by sending the second request message to the smartcard, acquiring TBK information necessary for TBK acquisition using the ID of the subscribed service from the service guide based on the acquisition information, and acquiring a TBK by performing an authentication process using the TBK information.

According to still another aspect of the present invention, there is provided a method for acquiring a Terminal Binding Key (TBK) in a mobile communication system. The TBK acquisition method includes receiving, by a first terminal, a service guide, in which information necessary for reception of each service is stored, from a BCAST Service Distribution/Adaptation (BSD/A), subscribing to at least one service using the service guide, and sending acquisition information for acquiring the service guide and an identifier (ID) of the subscribed service, to a smartcard; storing, by the smartcard, the acquisition information and the ID of the subscribed service; sending, by a second terminal, a third request message for requesting a service guide based on the acquisition information, to the BSD/A, and receiving a service guide based on the acquisition information from the BSD/A; receiving, by the second terminal, the ID of the subscribed service from the smartcard by sending a second request message for acquiring the ID of the subscribed service to the smartcard; and acquiring, by the second terminal, TBK information necessary for TBK acquisition using the ID of the subscribed service from the service guide based on the acquisition information, and acquiring the TBK by performing an authentication process using the TBK information.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF PREFERRED EMBODIMENTS

Preferred embodiments of the present invention will now be described in detail with reference to the annexed drawings. In the following description, a detailed description of known functions and configurations incorporated herein has been omitted for clarity and conciseness. Terms used herein are defined based on functions in the present invention and may vary according to users, operators' intention or usual practices. Therefore, the definition of the terms should be made based on contents throughout the specification.

Although embodiments of the present invention will be described using the names of entities defined in $3^{rd}$ Generation Partnership Project (3GPP) which is the standard for an asynchronous mobile communication system, or in Open Mobile Alliance (OMA) which is an application standard group for mobile terminals, it is not intended to limit the scope of the present invention to such standards and names, and the invention can be applied to any system having the similar technical background.

A gist of the present invention is to provide a scheme for acquiring a TBK using TBK-related information stored in a smartcard so that a user's second terminal can play back the services to which the user has previously subscribed through a first terminal.

The TBK-related information includes at least one of GlobalServiceID which is an Identifier (ID) of the subscribed service, TerminalBindingKeyID, and PermissionIssuerURL indicating a Uniform Resource Locator (URL) from which a TBK can be acquired. The PermissionIssuerURL is a URL of a BSM from which a second terminal acquires a TBK by sending a request therefor.

Figure 2:
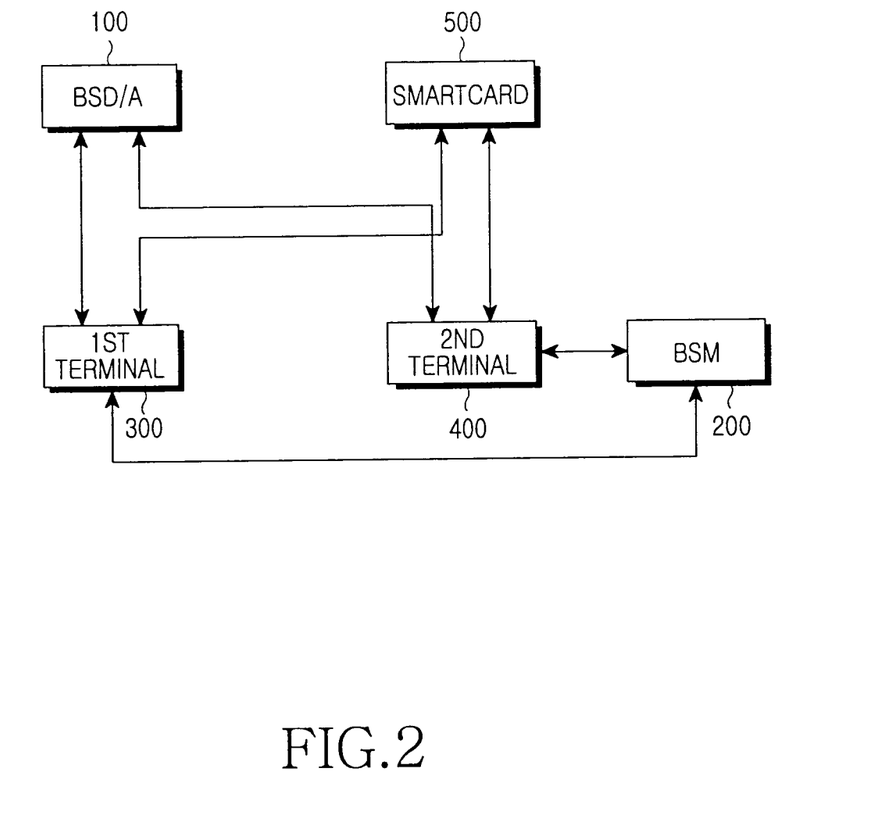
FIG. 2 is a diagram illustrating a TBK issuing system according to an embodiment of the present invention.

FIG. 2 is a diagram illustrating a TBK issuing system according to an embodiment of the present invention.

Referring to FIG. 2, a BCAST Service Distribution/Adaptation (BSD/A) 100 establishes a bearer through which it will transmit the BCAST service data provided from a BCAST Service Application (BSA), and determines a transmission schedule for the BCAST service. In particular, according to an embodiment of the present invention, the BSD/A 100 generates a service guide including service-related information therein, and transmits the service guide to a first terminal 300 and a second terminal 400. The service guide stores information necessary for reception of each service in the mobile communication system.

The first terminal 300 subscribes to a desired service(s) through the received service guide, and transmits at least one of the service guide and TBK-related information for the subscribed service to a smartcard 500.

The smartcard 500 stores at least one of the received service guide and TBK-related information, thereby performing a Rights Portability function in which several terminals can play back the previously subscribed service.

That is, in the case where the smartcard 500 has stored at least one of the received service guide and TBK-related information, when the smartcard 500 receives from the second terminal 400 a RetrieveRequest message of Table 1 for acquiring TBK-related information according to first and second embodiments of the present invention, it transmits at least one of the stored service guide and TBK-related information to the second terminal 400 using a RetrieveResponse message of Table 2.

Further, in the case where the smartcard 500 has stored at least one of the received service guide and TBK-related information, when the smartcard 500 receives from the second terminal 400 a RetrieveRequest message of Table 3 for acquiring TBK-related information according to third and fourth embodiments of the present invention, it transmits at least one of the stored service guide and TBK-related information to the second terminal 400 using a RetrieveResponse message Table 4.

When the same user accesses the second terminal 400, a BSM 200 performs an authentication process with the second terminal 400 before the second terminal 400 acquires TBK-related information for a service it has selected to play back now.

The second terminal 400 sends the RetrieveRequest message to the smartcard 500, and receives at least one of the stored service guide and TBK-related information from the smartcard 500 through a RetrieveResponse message in response to the RetrieveRequest message, thereby acquiring TBK-related information for the service it intends to play back now. The second terminal 400 performs an authentication process with the BSM 200 using the acquired TBK-related information, thereby being issued a TBK. Thus, the second terminal 400 can play back the previously subscribed service using the issued TBK.

TABLE 1

| Name | Type | Category | Cardinality | Description | Data Type |
|------|------|----------|-------------|-------------|-----------|
| Retrieve Request | E | | | Retrieve Request message | |
| Requested | E1 | M | 1 | Identifier of this message | unsignedInt |
| Tag | E1 | M | 1 | 0: terminal delivers service ID subscribed by user, and smartcard stores received service ID.<br>1: terminal delivers service guide, and smartcard store received service guide.<br>2: PermissionIssuerURL and TBK ID for TBK acquisition is delivered to smartcard.<br>3: terminal requests all subscribed service IDs stored in smartcard<br>4: terminal requests service guide stored in smartcard.<br>5: terminal requests TBK acquisition information (TBK ID, Permission IssuerURL) stored in smartcard. | unsignedByte |

TABLE 1-continued

| Name | Type | Category | Cardinality | Description | Data Type |
|---|---|---|---|---|---|
| Global ServiceID | E1 | O | 0...n | Identifier of TBK-requested service | anyRUI |
| Service Guide | E1 | O | 0...n | Service guide | string |
| TBK | E1 | O | 0...n | It has following attributes: TerminalBindingKeyID PermissionIssuerURL | |
| Terminal Binding KeyID | A | O | 1 | Identifier of TBK | anyURI |
| Permission IssuerURL | A | O | 1 | URL of Permission Issuer from which TBK can be acquired. | anyURI |

TABLE 2

| Name | Type | Category | Cardinality | Description | Data Type |
|---|---|---|---|---|---|
| Retrieve Response | E | | | Retrieve Response message | |
| Requested | E1 | M | 1 | RetrieveRequest message identifier | unsignedInt |
| Global StatusCode | E1 | M | 1 | Code value for handling result on RetrieveRequest message | unsignedByte |
| Global ServiceID | E1 | O | 0...n | Unique identifier indicating service | anyURI |
| TBK | E1 | O | 0...n | It has following attributes: TerminalBindingKeyID PermissionIssuerURL | |
| Terminal Binding KeyID | A | O | 1 | Identifier of TBK | anyURI |
| Permission IssuerURL | A | O | 1 | URL of Permission Issuer from which TBK can be acquired. | anyURI |
| Service Guide | E1 | O | 0...1 | Service Guide | string |

TABLE 3

| Name | Type | Category | Cardinality | Description | Data Type |
|---|---|---|---|---|---|
| Retrieve Request | E | | | Retrieve Request message | |
| Requested | A | O | 1 | Identifier of this request message | unsignedInt |
| Tag | A | M | 1 | Information requested by this message includes; 0 GlobalServiceID 1 SG Acquisition Information | unsignedByte |

TABLE 4

| Name | Type | Category | Cardinality | Description | Data Type |
|---|---|---|---|---|---|
| Retrieve Response | E | | | Retrieve Response message | |
| Requested | A | M | 1 | Identifier of this request message | unsignedInt |
| Global Status Code | A | M | 1 | Code value for handling result on RetrieveRequest message | Unsigned Byte |
| SG Acquisition URL | A | O | 0...1 | URL necessary for service guide acquisition | anyURI |
| Fragment id | A | O | 0...1 | Identifier of Fragment | anyURI |
| Global ServiceID | A | O | 0...1 | Unique identifier indicating service | anyURI |

Figure 3:
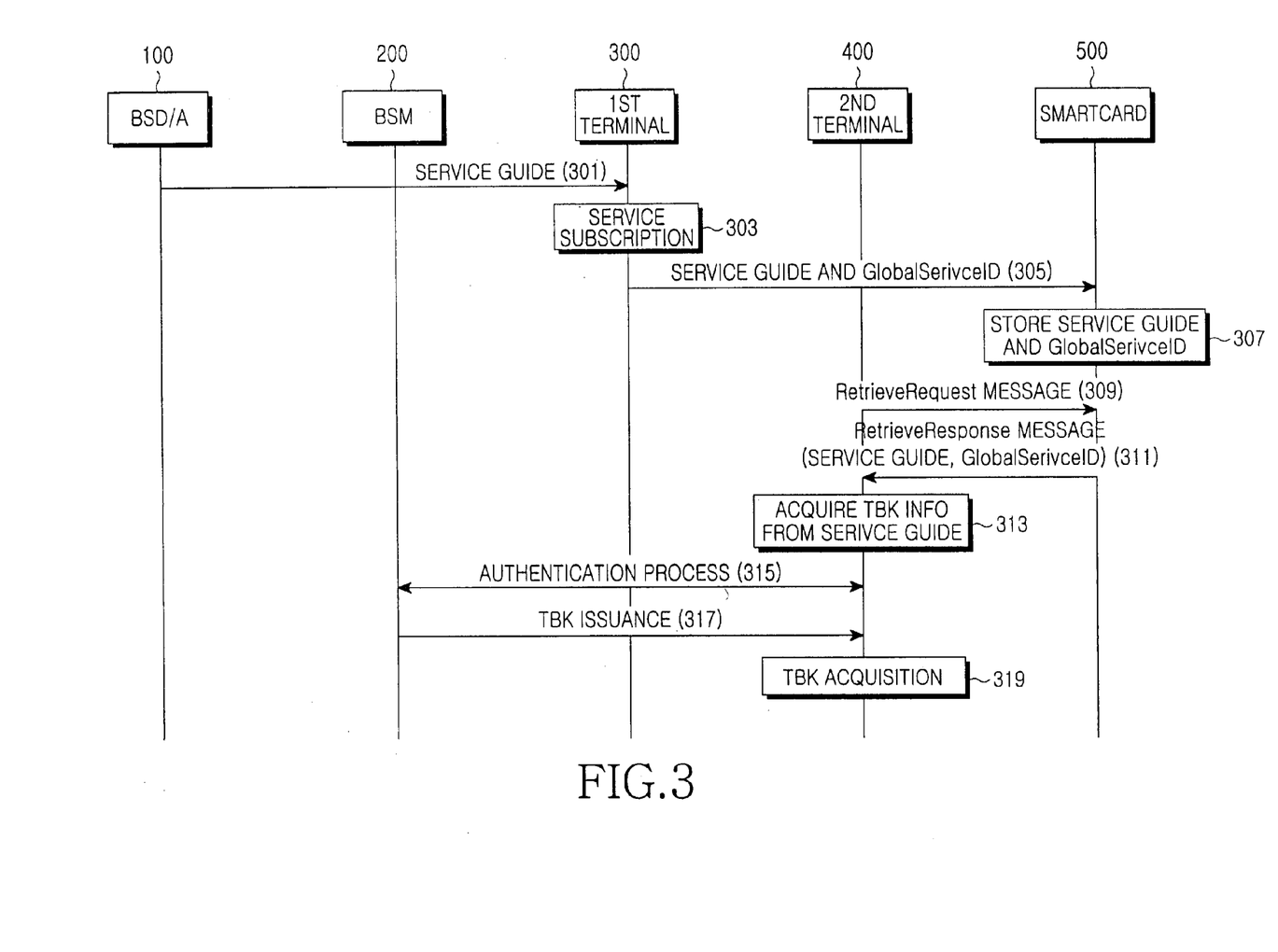
FIG. 3 is a diagram illustrating a procedure for acquiring a TBK using TBK-related information by a second terminal according to a first embodiment of the present invention.

FIG. 3 is a diagram illustrating a procedure for acquiring a TBK using TBK-related information by a second terminal according to a first embodiment of the present invention.

Referring to FIG. 3, steps 301 to 307 correspond to a process of storing, in a smartcard 500, TBK-related information for a service subscribed at a first terminal 300 according to the first embodiment of the present invention, and steps 309 to 319 correspond to a process of acquiring by a second terminal 400 a TBK using the service guide stored in the smartcard 500. Herein, The service guide include TBK-related information. And the TBK-related information includes GlobalServiceID and TBK information (TerminalBindingKeyID, PermissionIssuerURL).

In step 301, a BSD/A 100 sends a service guide, in which service-related information is stored, to the first terminal 300. Herein, the service guide includes TBK information as the service-related information.

In step 303, the first terminal 300 subscribes to a desired service(s) using the received service guide.

In step 305, the first terminal 300 sends the received service guide and GlobalServiceID of the subscribed service to the smartcard 500.

In step 307, the smartcard 500 stores the received service guide and GlobalServiceID. Further, the smartcard 500 stores the received GlobalServiceID together with GlobalServiceID for another service, previously received from the first terminal 300.

In step 309, when the smartcard 500 is inserted or an arbitrary service is requested, the second terminal 400 sends to the smartcard 500 a RetrieveRequest message of Table 1 for acquiring the service guide and GlobalServiceIDs. In step 311, after receiving the RetrieveRequest message, the smartcard 500 sends to the second terminal 400 a RetrieveResponse message of Table 2, in which the service guide and at least one GlobalServiceID, stored in step 307, are included.

In step 313, the second terminal 400 stores the service guide and GlobalServiceID received through the RetrieveResponse message, to use them upon service playback request, selects GlobalServiceID corresponding to a service it intends to play back now, from among the received at least one GlobalServiceID, and acquires TBK information corresponding to the selected GlobalServiceID from the received service guide. At this point, the second terminal 400 can determine a URL of a BSM that issues a TBK, using PermissionIssuerURL existing in the service guide.

Thereafter, in step 315, the second terminal 400 performs a TBK authentication process defined in OMA BCAST v1.0 with a BSM 200 designated by PermissionsIssuerURL in the acquired TBK information, and is issued a TBK from the BSM 200 in step 317. Thus, in step 319, the second terminal 400 acquires a TBK of a service corresponding to the selected GlobalServiceID.

Figure 4:
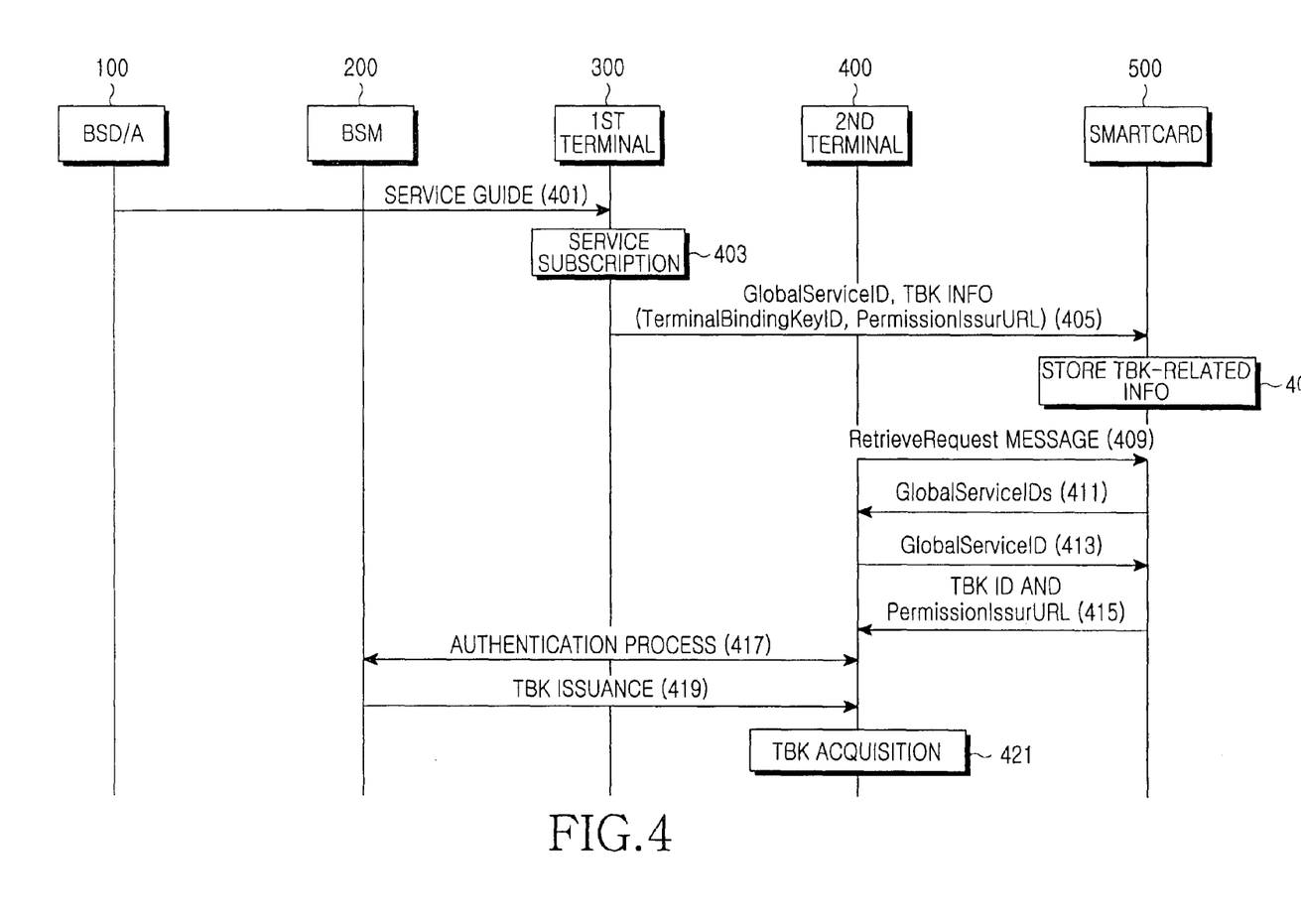
FIG. 4 is a diagram illustrating a procedure for acquiring a TBK using TBK-related information by a second terminal according to a second embodiment of the present invention.

FIG. 4 is a diagram illustrating a procedure for acquiring a TBK using TBK-related information by a second terminal according to a second embodiment of the present invention.

Referring to FIG. 4, steps 401 to 407 correspond to a process of storing, in a smartcard 500, TBK-related information for a service subscribed at a first terminal 300 according to the second embodiment of the present invention, and steps 409 to 421 correspond to a process of acquiring by a second terminal 400 a TBK using the TBK-related information stored in the smartcard 500.

In step 401, a BSD/A 100 sends a service guide to the first terminal 300. In step 403, the first terminal 300 subscribes to a service using the received service guide.

In step 405, the first terminal 300 sends TBK information (TerminalBindingKeyID, PermissionsIssuerURL) and GlobalServiceID for the subscribed service to the smartcard 500. In step 407, the smartcard 500 stores the received TBK information and GlobalServiceID.

In step 409, when the smartcard 500 is inserted or an arbitrary service is requested, the second terminal 400 sends to the smartcard 500 a RetrieveRequest message of Table 1 for acquiring TBK-related information.

In step 411, the smartcard 500 sends the stored GlobalServiceID for at least one service to which the user has subscribed, to the second terminal 400 through a RetrieveResponse message of Table 2.

In step 413, the second terminal 400 stores the received at least one GlobalServiceID so as to use it upon service playback request, selects GlobalServiceID corresponding to a service it intends to play back now, from among the received at least one GlobalServiceID, and sends the selected GlobalServiceID to the smartcard 500.

In step 415, the smartcard 500 acquires TBK information (TerminalBindingKeyID, PermissionsIssuerURL) corresponding to the selected GlobalServiceID, and sends the acquired TBK information to the second terminal 400 through the RetrieveResponse message of Table 2.

In step 417, the second terminal 400 performs an authentication process with a BSM 200 appointed by PermissionIssuerURL in the acquired TBK information, and is issued a TBK from the BSM 200 in step 419. Thus, in step 421, the second terminal 400 acquires a TBK of a service corresponding to the selected GlobalServiceID.

Figure 5:
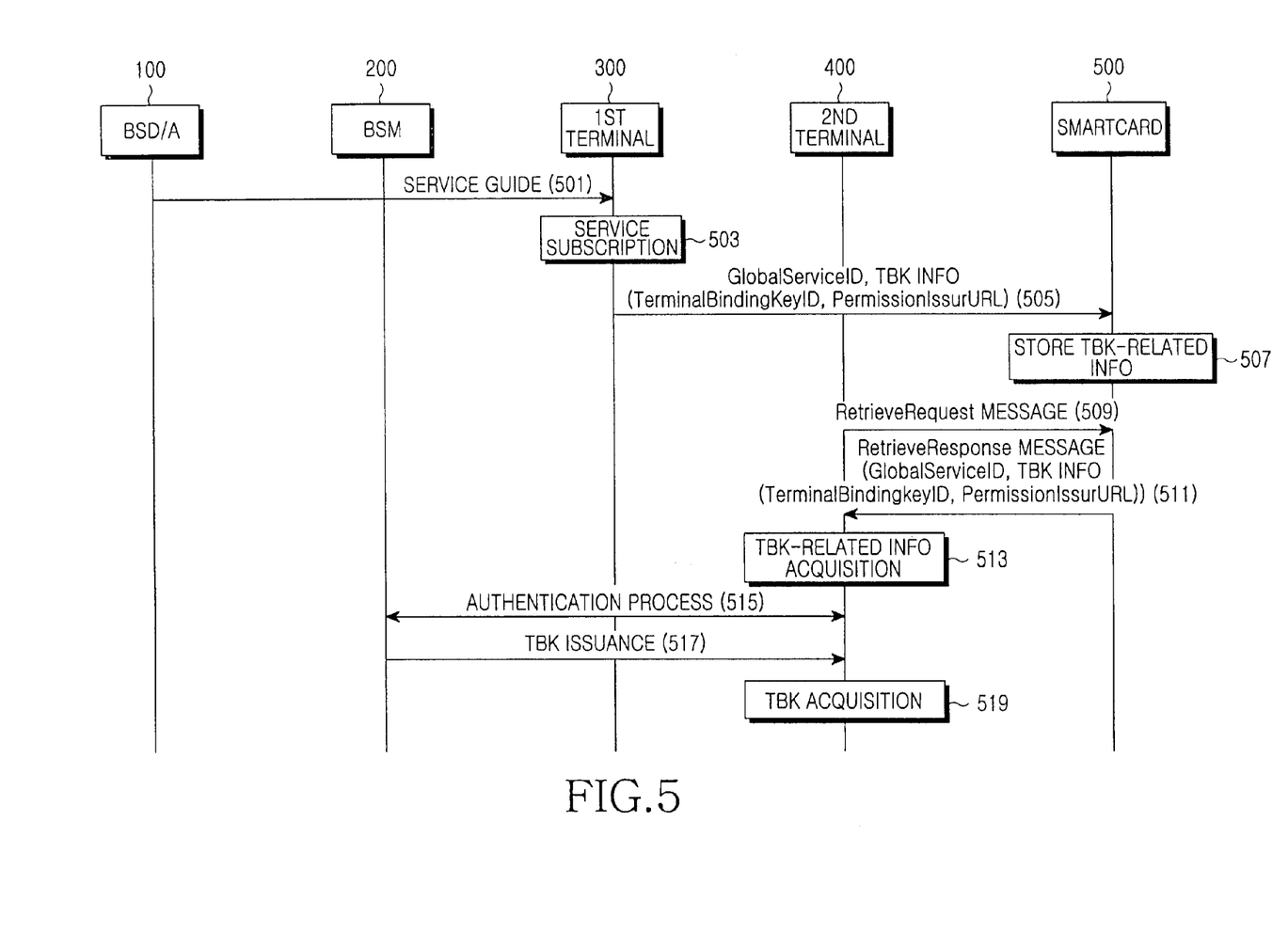
FIG. 5 is a diagram illustrating another example of a procedure for acquiring a TBK using TBK-related information by a second terminal according to the second embodiment of the present invention.

FIG. 5 is a diagram illustrating another example of a procedure for acquiring a TBK using TBK-related information by a second terminal according to the second embodiment of the present invention.

Referring to FIG. 5, steps 501 to 507 correspond to a process of storing, in a smartcard 500, TBK-related information for a service subscribed at a first terminal 300 according to the second embodiment of the present invention, and this process is equal to the process of steps 401 to 407. Steps 409 to 421 correspond to a process of acquiring by a second terminal 400 a TBK using the TBK-related information stored in the smartcard 500.

In step 509, when the smartcard 500 is inserted or an arbitrary broadcast service is requested, the second terminal 400 sends to the smartcard 500 a RetrieveRequest message of Table 1 for acquiring TBK-related information.

In step 511, the smartcard 500 sends GlobalServiceIDs, which is the stored GlobalServiceID of the service(s) subscribed by the user, and TBK information (TerminalBindingKeyID, PermissionIssuerURL) to the second terminal 400 through a RetrieveResponse message of Table 2.

In step 513, the second terminal 400 stores the received at least one TBK-related information so as to use it upon service playback request, selects GlobalServiceID of a service it intends to play back, from among the at least one TBK-related information, and acquires TBK information (TerminalBindingKeyID, PermissionIssuerURL) corresponding to the selected GlobalServiceID.

In step 515, the second terminal 400 performs an authentication process with a BSM 200 designated by PermissionIssuerURL in the acquired TBK-related information, and is issued a TBK from the BSM 200 in step 517. Thus, in step 519, the second terminal 400 acquires a TBK of a service corresponding to the selected GlobalServiceID.

In the first and second embodiments, when the first terminal 300 transmits TBK-related information to the smartcard 500, it can additionally send priority corresponding to the frequency of service playbacks. Therefore, in the case where the TBK-related information and the priority are stored together in the smartcard 500, if the priority of the service that the second terminal 400 has selected to play back now is higher, the first terminal 300 stores GlobalServiceID, TerminalBindingKeyID and PermissionIssuerURL in the smartcard 500 according to the second embodiment, so that the second terminal 400 can rapidly acquire the TBK-related information. However, if the priority of the service that the second terminal 400 has selected to play back now is lower, the first terminal 300 stores only the GlobalServiceID in the smartcard 500 according to the first embodiment, so that the second terminal 400 can determine only whether or not it has subscribed to the service.

A description will now be made of a method for acquiring a TBK through a service guide acquisition by a second terminal according to a third embodiment of the present invention, and a method for acquiring a TBK through an interactive channel using TBK-related information by a second terminal according to a fourth embodiment of the present invention.

Figure 6:
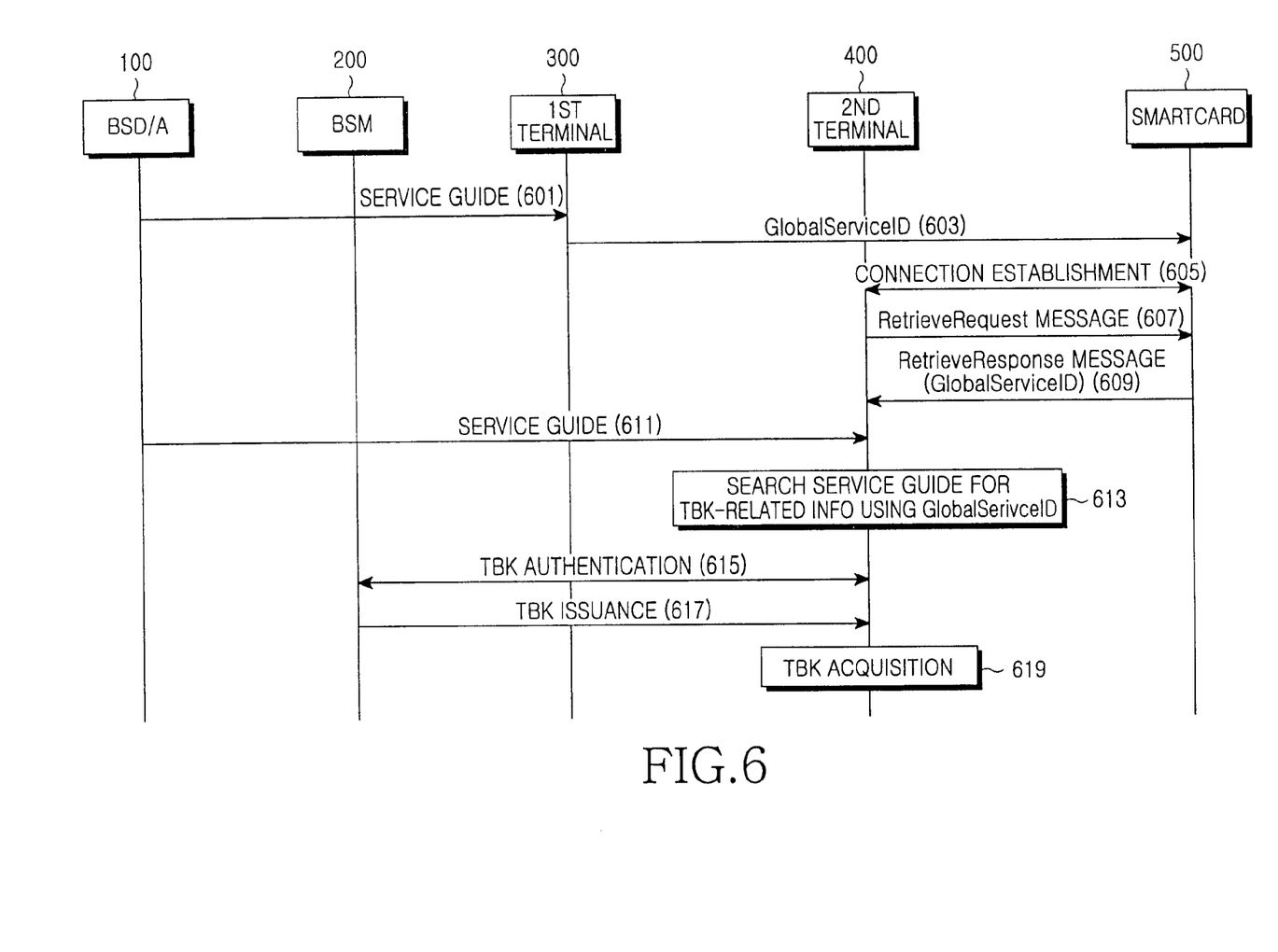
FIG. 6 is a diagram illustrating a procedure for acquiring a TBK through a broadcast channel using TBK-related information by a second terminal according to a third embodiment of the present invention.

FIG. 6 is a diagram illustrating a procedure for acquiring a TBK through a service guide acquisition over the broadcast channel by a second terminal according to a third embodiment of the present invention.

Referring to FIG. 6, in step 601, a BSD/A 100 sends a service guide to a first terminal 300 that has subscribed to a particular broadcast service. Though not shown in the drawing, if a TBK is required for the broadcast service to which the first terminal 300 has subscribed, the first terminal 300 acquires a TBK through authentication with the BSM 200. The authentication with the BSM 200 and the TBK acquisition follow the details specified in the OMA BCAST v1.0 standard.

In step 603, the first terminal 300 sends GlobalServiceID indicating an ID of the subscribed service, to the smartcard 500. In step 605, the smartcard 500 establishes a connection to the second terminal 400.

In step 607, after the connection establishment is completed, the second terminal 400 sends a RetrieveRequest message of Table 3 for requesting the GlobalServiceID, to the smartcard 500. In step 609, the second terminal 400 receives from the smartcard 500 a RetrieveResponse message of Table 4, in which the GlobalServiceID is included.

In step 611, the second terminal 400 receives a service guide from the BSD/A 100 through a broadcast channel. In step 613, the second terminal 400 searches the received service guide for TBK-related information necessary for TBK acquisition using the GlobalServiceID. The search is achieved by checking if there is a TBK-related field in the service guide.

In step 615, the second terminal 400 performs an authentication process defined in OMA BCAST v1.0 after connecting with a BSM 200 corresponding to PermissionIssuerURL in the TBK-related information included in the service guide. In step 617, the second terminal 400 is issued a TBK from the BSM 200. In step 619, the second terminal 400 acquires a TBK of the service requiring the TBK.

Figure 7:
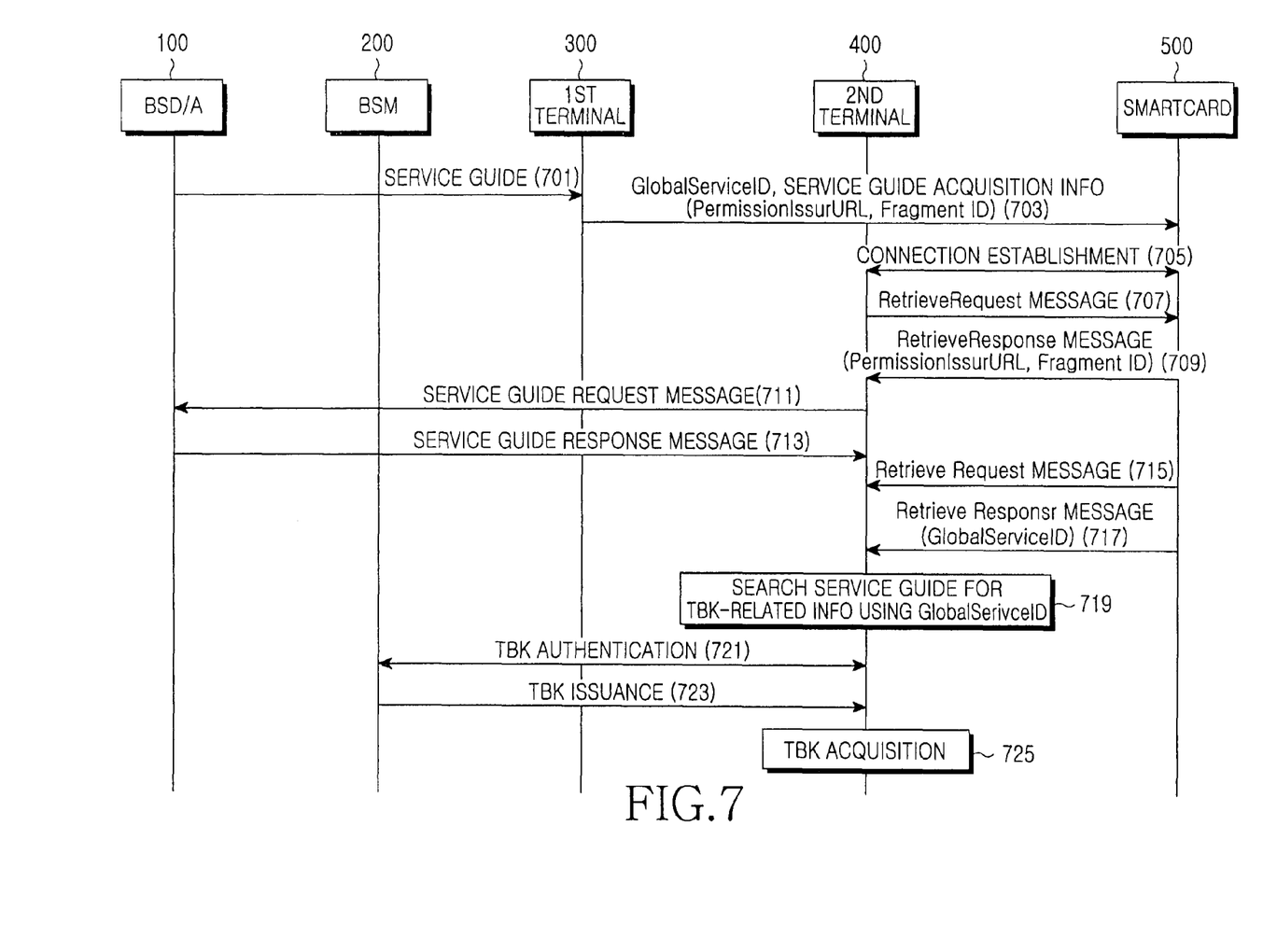
FIG. 7 is a diagram illustrating a procedure for acquiring a TBK through an interactive channel using TBK-related information by a second terminal according to a fourth embodiment of the present invention.

FIG. 7 is a diagram illustrating a procedure for acquiring a TBK through an interactive channel using TBK-related information by a second terminal according to a fourth embodiment of the present invention.

Referring to FIG. 7, in step 701, a BSD/A 100 sends a service guide to a first terminal 300. In step 703, the first terminal 300 subscribes to at least one service using the service guide, and then sends, to the smartcard 500, service guide acquisition information for acquiring the service guide, and an ID of the subscribed service. The service guide acquisition information includes a Fragment ID of a service guide associated with the subscribed service, and URL information (SG Acquisition URL) based on which the service guide can be acquired.

In step 705, the smartcard 500 establishes a connection to the second terminal 400. In step 707, after the connection establishment is completed, the second terminal 400 sends a RetrieveRequest message for requesting the service guide acquisition information, to the smartcard 500. In step 709, the second terminal 400 receives service guide acquisition information (SG Acquisition URL, Fragment ID) from the smartcard 500 through a RetrieveResponse message of Table 4 in order to acquire a service guide in which TBK-related information is included.

In step 711, the second terminal 400 sends a service guide request message for requesting the service guide to the BSD/A 100 according to the received service guide acquisition information (SG Acquisition URL, Fragment ID). In step 713, the second terminal 400 receives the requested service guide from the BSD/A 100.

In step 715, the second terminal 400 designates a Tag field of the RetrieveRequest message of Table 3, as '0', and sends it to the smartcard 500 in order to acquire GlobalServiceID indicating an ID of the subscribed service, included in TBK-related information. In step 717, the second terminal 400 receives from the smartcard 500 a RetrieveResponse message of Table 4, in which GlobalServiceID is included.

In step 719, the second terminal 400 searches the received service guide for TBK-related information (TerminalBindingKeyID, PermissionIssuerURL, etc.) necessary for TBK acquisition using the GlobalServiceID. The search is achieved by checking if there is a TBK-related field in the service guide.

In step 721, the second terminal 400 performs an authentication process defined in OMA BCAST v1.0 after connecting with a BSM 200 associated with the PermissionIssuerURL acquired from the service guide. In step 723, the second terminal 400 is issued a TBK from the BSM 200. In step 725, the second terminal 400 acquires a TBK of the service requiring the TBK.

Though the method defined in FIG. 7 is used for TBK acquisition, it can also be used for acquisition of the entire service guide in the second terminal 400. To this end, the second terminal 400 designates values in a message body of HTTP/1.1 in the form of <key>-<value> in step 711. That is, the second terminal 400 designates "all" in <key> and "true" in <value>, and sends them to the BSD/A 100. In response thereto, the second terminal 400 can receive the requested entire service guide from the BSD/A 100.

As is apparent from the foregoing description, according to the present invention, a user's new terminal can be issued a TBK, and thus, it can play back the service to which the user has previously subscribed.

Further, according to the present invention, when the user intends to enjoy services and contents requiring a TBK using a new terminal, use of security services and contents is possible as the TBK is provided to the new terminal.

In addition, in order to allow even a replaced terminal to enjoy the service to which the user has previously subscribed, the present invention enables the replaced terminal to receive a service guide through an interactive channel.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A system for acquiring a Terminal Binding Key (TBK) in a mobile communication system, the system comprising:
   a first terminal for subscribing to at least one service using a service guide in which information necessary for reception of each of the at least one subscribed service is stored, and sending the service guide and an identifier (ID) of each of the at least one subscribed service to a smartcard;
   the smartcard for storing the service guide and the ID of each of the at least one subscribed service, and sending the service guide and the ID of each of the at least one subscribed service to a second terminal through a response message to a request message used for acquiring TBK information, received from the second terminal; and
   the second terminal for receiving the response message by sending the request message to the smartcard, acquiring TBK information corresponding to a service selected to be played back by the second terminal from among the at least one subscribed service, from the service guide depending on the ID of each of the at least one subscribed service included in the response message, and acquiring the TBK by performing an authentication process using the TBK information.

2. The system of claim 1, wherein the TBK information comprises at least one of a respective TBK ID for each of the at least one subscribed service, and a respective Uniform Resource Locator (URL) for each of the at least one subscribed service from which the TBK corresponding to the corresponding subscribed service can be issued.

3. A system for acquiring a Terminal Binding Key (TBK) in a mobile communication system, the system comprising:
   a first terminal for subscribing to at least one service using a service guide in which information necessary for reception of each of the at least one subscribed service is stored, and sending TBK-related information used for encrypting an encryption key of each of the at least one subscribed service, to a smartcard;
   the smartcard for storing the TBK-related information, and outputting the TBK-related information through a response message to a request message used for acquiring the TBK-related information, received from a second terminal; and
   the second terminal for receiving the response message from the smartcard by sending the request message to the smartcard, acquiring TBK-related information corresponding to a service selected to be played back by the second terminal from among the at least one subscribed service, depending on the response message, and acquiring the TBK by performing an authentication process using the TBK-related information.

4. The system of claim 3, wherein the TBK-related information comprises at least one of an identifier (ID) of each of the at least one subscribed service, a respective TBK ID for each of the at least one subscribed service, and a Uniform Resource Locator (URL) for each of the at least one subscribed service from which the TBK corresponding to the corresponding subscribed service can be issued.

5. The system of claim 4, wherein the second terminal receives the ID of each of the at least one subscribed service by sending a request for the ID of each of the at least one subscribed service to the smartcard, selects an ID of the service selected to be played back by the second terminal, from among the ID of each of the at least one subscribed service, sends the request message including the selected ID to the smartcard, and receives the response message in which a TBK ID and a URL corresponding to the selected ID are included.

6. The system of claim 4, wherein the second terminal receives the ID of each of the at least one subscribed service, and TBK ID and URL of each of the at least one subscribed service through the response message, selects an ID of the service selected to be played back by the second terminal, from among the ID of each of the at least one subscribed service, and acquires a TBK ID and a URL corresponding to the selected ID.

7. A method for acquiring a Terminal Binding Key (TBK) in a mobile communication system, the method comprising:
   subscribing, by a the first terminal, to at least one service using a service guide in which information necessary for reception of each of the at least one subscribed service is stored, and sending the service guide and an identifier (ID) of each of the at least one subscribed service to a smartcard;
   storing, by the smartcard, the service guide and the ID of each of the at least one subscribed service;
   sending, by a second terminal, a request message for acquiring TBK information to the smartcard;
   sending, by the smartcard, the stored service guide and ID of each of the at least one subscribed service to the second terminal through a response message to the request message; and
   receiving, by the second terminal, the response message, acquiring TBK information corresponding to a service selected to be played back by the second terminal from among the at least one subscribed service, from the service guide depending on the ID of each of the at least one subscribed service, included in the response message, and acquiring the TBK by performing an authentication process using the acquired TBK information.

8. The method of claim 7, wherein the TBK information comprises at least one of a respective TBK ID for each of the at least one subscribed service, and a respective Uniform Resource Locator (URL) for each of the at least one subscribed service from which the TBK corresponding to the corresponding subscribed service can be issued.

9. A method for acquiring a Terminal Binding Key (TBK) in a mobile communication system, the method comprising:
   subscribing, by a the first terminal, to at least one service using a service guide in which information necessary for reception of each of the at least one subscribed service is stored, and sending TBK-related information used for encrypting an encryption key of each of the at least one subscribed service, to a smartcard;
   storing, by the smartcard, the TBK-related information;
   sending, by a second terminal, a request message for acquiring the TBK-related information to the smartcard;
   sending, by the smartcard, the stored TBK-related information to the second terminal through a response message to the request message; and
   receiving, by the second terminal, the response message, acquiring TBK-related information corresponding to a service selected to be played back by the second terminal from among the at least one subscribed service, depending on the response message, and acquiring the TBK by performing an authentication process using the TBK-related information.

10. The method of claim 9, wherein the TBK-related information comprises at least one of an identifier (ID) of each of the at least one subscribed service, a respective TBK ID for each of the at least one subscribed service, and a Uniform Resource Locator (URL) for each of the at least one subscribed service from which the TBK corresponding to the corresponding subscribed service can be issued.

11. The method of claim 10, wherein acquiring a TBK comprises:
receiving the ID of each of the at least one subscribed service by sending a request for the ID of each of the at least one subscribed service to the smartcard; and
selecting an ID of the service selected to be played back by the second terminal, from among the ID of each of the at least one subscribed service, sending the request message including the selected ID to the smartcard, and receiving the response message in which a TBK ID and a URL corresponding to the selected ID are included.

12. The method of claim 10, wherein acquiring a TBK comprises:
receiving an ID of each of the at least one subscribed service, and a TBK ID and a URL of each of the at least one subscribed service through the response message; and
selecting an ID of the service selected to be played back by the second terminal, from among the ID of the each of at least one subscribed service, and acquiring a TBK ID and a URL corresponding to the selected ID.

13. A system for acquiring a Terminal Binding Key (TBK) in a mobile communication system, the system comprising:
a first terminal for receiving a service guide, in which information necessary for reception of each service is stored, from a BCAST Service Distribution/Adaptation (B SD/A), subscribing to at least one service using the service guide, and sending acquisition information for acquiring the service guide and an identifier (ID) of each of the at least one subscribed service, to a smartcard;
the smartcard for storing the acquisition information and the ID of each of the at least one subscribed service, sending the acquisition information to a second terminal through a response message to a first request message for acquiring the acquisition information, received from the second terminal, and sending the ID of each of the at least one subscribed service to the second terminal through a response message to a second request message for acquiring the ID of each of the at least one subscribed service, received from the second terminal; and
the second terminal for receiving a service guide based on the acquisition information from the BSD/A by sending a third request message for requesting the service guide based on the acquisition information to the BSD/A, receiving the ID of each of the at least one subscribed service by sending the second request message to the smartcard, acquiring TBK information necessary for TBK acquisition using the ID of each of the at least one subscribed service from the service guide based on the acquisition information, and acquiring a TBK by performing an authentication process using the TBK information.

14. The system of claim 13, wherein the TBK information comprises at least one of a respective TBK ID for each of the at least one subscribed service, and a respective Uniform Resource Locator (URL) for each of the at least one subscribed service from which the TBK corresponding to the corresponding subscribed service can be issued.

15. The system of claim 13, wherein the acquisition information comprises a URL from which the service guide can be acquired, and a Fragment ID of the service guide.

16. A method for acquiring a Terminal Binding Key (TBK) in a mobile communication system, the method comprising:
receiving, by a first terminal, a service guide, in which information necessary for reception of each service is stored, from a BCAST Service Distribution/Adaptation (BSD/A), subscribing to at least one service using the service guide, and sending acquisition information for acquiring the service guide and an identifier (ID) of each of the at least one subscribed service, to a smartcard;
storing, by the smartcard, the acquisition information and the ID of each of the at least one subscribed service;
sending, by a second terminal, a third request message for requesting a service guide based on the acquisition information, to the BSD/A, and receiving the requested service guide based on the acquisition information from the BSD/A;
receiving, by the second terminal, the ID of each of the at least one subscribed service from the smartcard by sending a second request message for acquiring the ID of each of the at least one subscribed service to the smartcard; and
acquiring, by the second terminal, TBK information necessary for TBK acquisition using the ID of each of the at least one subscribed service from the service guide based on the acquisition information, and acquiring the TBK by performing an authentication process using the TBK information.

17. The method of claim 16, wherein the TBK information comprises at least one of a respective TBK ID for each of the at least one subscribed service, and a respective Uniform Resource Locator (URL) for each of the at least one subscribed service from which the TBK corresponding to the corresponding subscribed service can be issued.

18. The method of claim 16, wherein the acquisition information comprises a URL from which the service guide can be acquired, and a Fragment ID of the service guide.

19. A method for acquiring a Terminal Binding Key (TBK) in a mobile communication system, the method comprising:
sending, by a second terminal, a request message for acquiring TBK information to a smartcard;
receiving, by the second terminal, service guide and an IDentifier (ID) of each of at least one service from the smartcard through a response message to the request message, where the service guide and the ID of each of at least one service is sent from a first terminal subscribed to the at least one service and is stored in the smartcard ; and
acquiring, by the second terminal, TBK information corresponding to a service selected to be played back by the second terminal from among the at least one subscribed service, from the service guide depending on the ID of each of the at least one subscribed service, included in the response message, and acquiring the TBK by performing an authentication process using the acquired TBK information.

20. The method of claim 19, wherein the TBK information comprises at least one of a respective TBK ID for each of the at least one subscribed service, and a respective Uniform Resource Locator (URL) for each of the at least one subscribed service from which the TBK corresponding to the corresponding subscribed service can be issued.

21. A method for acquiring a Terminal Binding Key (TBK) in a mobile communication system, the method comprising:
sending, by a second terminal, a request message for acquiring TBK-related information used for encrypting an encryption key of each of at least one subscribed service to a smartcard, the TBK-related information is sent from a first terminal subscribed to the at least one service and is stored in the smartcard;

receiving, by the second terminal, the TBK-related information from the smartcard through a response message to the request message; and acquiring, by the second terminal, TBK-related information corresponding to a service selected to be played back by the second terminal from among the at least one subscribed service, depending on the response message, and acquiring the TBK by performing an authentication process using the TBK-related information.

22. The method of claim 21, wherein the TBK-related information comprises at least one of an IDentifier (ID) of each of the at least one subscribed service, a respective TBK ID for each of the at least one subscribed service, and a Uniform Resource Locator (URL) for each of the at least one subscribed service from which the TBK corresponding to the corresponding subscribed service can be issued.

23. The method of claim 22, wherein acquiring a TBK comprises:

receiving the ID of each of the at least one subscribed service by sending a request for the ID of each of the at least one subscribed service to the smartcard; and selecting an ID of the service selected to be played back by the second terminal, from among the ID of each of the at least one subscribed service, sending the request message including the selected ID to the smartcard, and receiving the response message in which a TBK ID and a URL corresponding to the selected ID are included.

24. The method of claim 22, wherein acquiring a TBK comprises:

receiving an ID of each of the at least one subscribed service, and a TBK ID and a URL of each of the at least one subscribed service through the response message; and selecting an ID of the service selected to be played back by the second terminal, from among the ID of each of the at least one subscribed service, and acquiring a TBK ID and a URL corresponding to the selected ID.

25. A method for acquiring a Terminal Binding Key (TBK) in a mobile communication system, the method comprising:

sending, by a second terminal, a first request message for requesting a service guide based on acquisition information for acquiring a service guide and an IDentifier (ID) of each of at least one subscribed service, to a BCAST Service Distribution/Adaptation (BSD/A), and receiving the requested service guide based on the acquisition information from the BSD/A, the acquisition information is sent from a first terminal subscribed to the at least one service and is stored with the ID of each of the at least one subscribed service in a smartcard;

receiving, by the second terminal, the ID of each of the at least one subscribed service from the smartcard by sending a second request message for acquiring the ID of each of the at least one subscribed service to the smartcard; and acquiring, by the second terminal, TBK information necessary for TBK acquisition using the ID of each of the at least one subscribed service from the service guide based on the acquisition information, and acquiring the TBK by performing an authentication process using the TBK information.

26. The method of claim 25, wherein the TBK information comprises at least one of a respective TBK ID for each of the at least one subscribed service, and a respective Uniform Resource Locator (URL) for each of the at least one subscribed service from which the TBK corresponding to the corresponding subscribed service can be issued.

27. The method of claim 25, wherein the acquisition information comprises a Uniform Resource Locator (URL) from which the service guide can be acquired, and a Fragment ID of the service guide.

28. A method for acquiring a Terminal Binding Key (TBK) in a mobile communication system, the method comprising:

receiving, by a smartcard, a service guide and an IDentifier (ID) of each of at least one service from a first terminal subscribed to the at least one service;

storing, by the smartcard, the service guide and the ID of each of the at least one subscribed service;

receiving, by the smartcard, a request message for acquiring TBK information from a second terminal; and sending, by the smartcard, the service guide and the ID of each of the at least one service to the second terminal through a response message to the request message, wherein the response message includes TBK information corresponding to a service selected to be played back by the second terminal from among the at least one subscribed service, and the second terminal acquires the TBK information from the service guide depending on the ID of each of the at least one subscribed service and the TBK by performing an authentication process using the acquired TBK information.

29. The method of claim 28, wherein the TBK information comprises at least one of a respective TBK ID for each of the at least one subscribed service, and a respective Uniform Resource Locator (URL) for each of the at least one subscribed service from which the TBK corresponding to the corresponding subscribed service can be issued.

30. A method for acquiring a Terminal Binding Key (TBK) in a mobile communication system, the method comprising:

receiving, by a smartcard, TBK-related information used for encrypting an encryption key of each of at least one service from a first terminal subscribed to the at least one service;

storing, by the smartcard, the TBK-related information;

receiving, by the smartcard, a request message for acquiring the TBK-related information from a second terminal; and sending, by the smartcard, the stored TBK-related information to the second terminal through a response message to the request message, wherein the response message includes the TBK-related information corresponding to a service selected to be played back by the second terminal from among the at least one subscribed service, and second terminal acquires the TBK information depending on the response message and the TBK by performing an authentication process using the TBK-related information.

31. The method of claim 30, wherein the TBK-related information comprises at least one of an IDentifier (ID) of each of the at least one subscribed service, a respective TBK ID for each of the at least one subscribed service, and a Uniform Resource Locator (URL) for each of the at least one subscribed service from which the TBK corresponding to the corresponding subscribed service can be issued.

32. The method of claim 31, further comprising:

receiving, by the smartcard, a request for the ID of each of the at least one subscribed service from the second terminal, and sending the ID of each of the at least one subscribed service to the second terminal; and receiving, by the smartcard, the request message including an ID of the service that the second terminal selects to be played back, from among the ID of each of the at least one subscribed service, and sending the response message in which a TBK ID and a URL corresponding to the selected ID are included.

33. The method of claim 31, further comprising:
sending, by the smartcard, an ID of each of the at least one subscribed service, and a TBK ID and a URL of each of the at least one subscribed service through the response message,
wherein the second terminal selects an ID of the service selected to be played back by the second terminal, from among the ID of each of the at least one subscribed service, and acquires a TBK ID and a URL corresponding to the selected ID.

34. A method for acquiring a Terminal Binding Key (TBK) in a mobile communication system, the method comprising:
receiving, by a smartcard, acquisition information for acquiring a service guide and an IDentifier (ID) of each of at least one service, from a first terminal subscribed to the at least one service;
storing, by the smartcard, the acquisition information and the ID of each of the at least one service; and
sending, by the smartcard, the ID of each of the at least one subscribed service from the smartcard in response to receipt of a request message for acquiring the ID of each of the at least one subscribed service from the second terminal,
wherein the second terminal acquires TBK information necessary for TBK acquisition using the ID of each of the at least one subscribed service from the service guide based on the acquisition information, and acquires the TBK by performing an authentication process using the TBK information.

35. The method of claim 34, wherein the TBK information comprises at least one of a respective TBK ID for each of the at least one subscribed service, and a respective Uniform Resource Locator (URL) for each of the at least one subscribed service from which the TBK corresponding to the corresponding subscribed service can be issued.

36. The method of claim 34, wherein the acquisition information comprises a URL from which the service guide can be acquired, and a Fragment ID of the service guide.

37. A terminal for acquiring a Terminal Binding Key (TBK) in a mobile communication system, the terminal comprising:
a transceiver for sending a request message for acquiring TBK information to a smartcard, and for receiving service guide and an IDentifier (ID) of each of at least one service from the smartcard through a response message to the request message, the service guide and the ID of each of at least one service is sent from a first terminal subscribed to the at least one service and is stored in the smartcard; and
a controller for acquiring TBK information corresponding to a service selected to be played back by the terminal from among the at least one subscribed service, from the service guide depending on the ID of each of the at least one subscribed service, included in the response message, and for acquiring the TBK by performing an authentication process using the acquired TBK information.

38. The terminal of claim 37, wherein the TBK information comprises at least one of a respective TBK ID for each of the at least one subscribed service, and a respective Uniform Resource Locator (URL) for each of the at least one subscribed service from which the TBK corresponding to the corresponding subscribed service can be issued.

39. A terminal for acquiring a Terminal Binding Key (TBK) in a mobile communication system, the terminal comprising:
a transceiver for sending a request message for acquiring TBK-related information used for encrypting an encryption key of each of at least one subscribed service to a smartcard, where the TBK-related information is sent from another terminal subscribed to the at least one service and is stored in the smartcard, and for receiving the TBK-related information from the smartcard through a response message to the request message; and
a controller for acquiring TBK-related information corresponding to a service selected to be played back by the terminal from among the at least one subscribed service, depending on the response message, and for acquiring the TBK by performing an authentication process using the TBK-related information.

40. The terminal of claim 39, wherein the TBK-related information comprises at least one of an IDentifier (ID) of each of the at least one subscribed service, a respective TBK ID for each of the at least one subscribed service, and a Uniform Resource Locator (URL) for each of the at least one subscribed service from which the TBK corresponding to the corresponding subscribed service can be issued.

41. The terminal of claim 40, wherein the terminal receives the ID of each of the at least one subscribed service by sending a request for the ID of each of the at least one subscribed service to the smartcard, selects an ID of the service selected to be played back by the terminal, from among the ID of each of the at least one subscribed service, sends the request message including the selected ID to the smartcard, and receives the response message in which a TBK ID and a URL corresponding to the selected ID are included.

42. The terminal of claim 40, wherein the terminal receives the ID of each of the at least one subscribed service, and TBK ID and URL of each of the at least one subscribed service through the response message, selects an ID of the service selected to be played back by the terminal, from among the ID of each of the at least one subscribed service, and acquires a TBK ID and a URL corresponding to the selected ID.

43. A terminal for acquiring a Terminal Binding Key (TBK) in a mobile communication system, the terminal comprising:
a transceiver for sending a first request message for requesting a service guide based on acquisition information for acquiring a service guide and an IDentifier (ID) of each of at least one subscribed service, to a BCAST Service Distribution/Adaptation (BSD/A), for receiving the requested service guide based on the acquisition information from the BSD/A, where the acquisition information is sent from another terminal subscribed to the at least one service and is stored with the ID of each of the at least one subscribed service in a smartcard, and for receiving the ID of each of the at least one subscribed service from the smartcard by sending a second request message for acquiring the ID of each of the at least one subscribed service to the smartcard; and
a controller for acquiring TBK information necessary for TBK acquisition using the ID of each of the at least one subscribed service from the service guide based on the acquisition information, and for acquiring the TBK by performing an authentication process using the TBK information.

44. The terminal of claim 43, wherein the TBK information comprises at least one of a respective TBK ID for each of the at least one subscribed service, and a respective Uniform Resource Locator (URL) for each of the at least one subscribed service from which the TBK corresponding to the corresponding subscribed service can be issued.

45. The terminal of claim 43, wherein the acquisition information comprises a Uniform Resource Locator (URL) from which the service guide can be acquired, and a Fragment ID of the service guide.

46. A smartcard for acquiring a Terminal Binding Key (TBK) in a mobile communication system, the smartcard comprising:
a microprocessor for receiving a service guide and an IDentifier (ID) of each of at least one service from a first terminal subscribed to the at least one service, for receiving a request message for acquiring TBK information from a second terminal, and for sending the service guide and the ID of each of the at least one service to the second terminal through a response message to the request message; and
a memory for storing the service guide and the ID of each of the at least one subscribed service,
wherein the response message includes TBK information corresponding to a service selected to be played back by the second terminal from among the at least one subscribed service, and the second terminal acquires the TBK information from the service guide depending on the ID of each of the at least one subscribed service and the TBK by performing an authentication process using the acquired TBK information.

47. The smartcard of claim 46, wherein the TBK information comprises at least one of a respective TBK ID for each of the at least one subscribed service, and a respective Uniform Resource Locator (URL) for each of the at least one subscribed service from which the TBK corresponding to the corresponding subscribed service can be issued.

48. A smartcard for acquiring a Terminal Binding Key (TBK) in a mobile communication system, the smartcard comprising:
a microprocessor for receiving TBK-related information used for encrypting an encryption key of each of at least one service from a first terminal subscribed to the at least one service, for receiving a request message for acquiring the TBK-related information from a second terminal, and for sending the stored TBK-related information to the second terminal through a response message to the request message; and
a memory for storing the TBK-related information,
wherein the response message includes the TBK-related information corresponding to a service selected to be played back by the second terminal from among the at least one subscribed service, and the second terminal acquires the TBK-related information depending on the response message and the TBK by performing an authentication process using the TBK-related information.

49. The smartcard of claim 48, wherein the TBK-related information comprises at least one of an identifier (ID) of each of the at least one subscribed service, a respective TBK ID for each of the at least one subscribed service, and a Uniform Resource Locator (URL) for each of the at least one subscribed service from which the TBK corresponding to the corresponding subscribed service can be issued.

50. The smartcard of claim 49, wherein the microprocessor receives a request for the ID of each of the at least one subscribed service from the second terminal, and sending the ID of each of the at least one subscribed service to the second terminal, receives the request message including an ID of the service that the second terminal selects to be played back, from among the ID of each of the at least one subscribed service, and sends the response message in which a TBK ID and a URL corresponding to the selected ID are included.

51. The smartcard of claim 49, wherein the microprocessor sends an ID of each of the at least one subscribed service, and a TBK ID and a URL of each of the at least one subscribed service through the response message, and
wherein the second terminal selects an ID of the service selected to be played back by the second terminal, from among the ID of each of the at least one subscribed service, and acquires a TBK ID and a URL corresponding to the selected ID.

52. A smartcard for acquiring a Terminal Binding Key (TBK) in a mobile communication system, the smartcard comprising:
a microprocessor for receiving acquisition information for acquiring a service guide and an IDentifier (ID) of each of at least one service, from a first terminal subscribed to the at least one service, for sending the ID of each of the at least one subscribed service from the smartcard in response to receipt of a request message for acquiring the ID of each of the at least one subscribed service from the second terminal; and
a memory for storing the acquisition information and the ID of each of the at least one service, and
wherein the second terminal acquires TBK information necessary for TBK acquisition using the ID of each of the at least one subscribed service from the service guide based on the acquisition information, and acquires the TBK by performing an authentication process using the TBK information.

53. The smartcard of claim 52, wherein the TBK information comprises at least one of a respective TBK ID for each of the at least one subscribed service, and a respective Uniform Resource Locator (URL) for each of the at least one subscribed service from which the TBK corresponding to the corresponding subscribed service can be issued.

54. The smartcard of claim 52, wherein the acquisition information comprises a URL from which the service guide can be acquired, and a Fragment ID of the service guide.

* * * * *